United States Patent
Lim et al.

(10) Patent No.: US 8,125,576 B2
(45) Date of Patent: Feb. 28, 2012

(54) DISPLAY DEVICE COMPRISING A HOUSING AND A PICTURE DISPLAY UNIT

(75) Inventors: Beng Hai Lim, Singapore (SG); Callistus Chong Teck Meng, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 1703 days.

(21) Appl. No.: 10/504,657

(22) PCT Filed: Jan. 21, 2003

(86) PCT No.: PCT/IB03/00169
§ 371 (c)(1),
(2), (4) Date: Aug. 12, 2004

(87) PCT Pub. No.: WO03/069900
PCT Pub. Date: Aug. 21, 2003

(65) Prior Publication Data
US 2005/0162573 A1    Jul. 28, 2005

(30) Foreign Application Priority Data
Feb. 18, 2002 (SG) .................. PCT/SG02/00039

(51) Int. Cl.
*H04N 5/65* (2006.01)
*H04N 9/64* (2006.01)
(52) U.S. Cl. .................. 348/818; 348/789
(58) Field of Classification Search .............. 348/836, 348/832, 842, 818, 789; 345/32, 419; 361/681, 361/680, 682, 683
See application file for complete search history.

(56) References Cited

U.S. PATENT DOCUMENTS

| | | | |
|---|---|---|---|
| 3,139,485 A * | 6/1964 | Gray et al. ............. | 348/836 |
| 4,758,763 A * | 7/1988 | Gorton ............. | 313/482 |
| 4,873,578 A * | 10/1989 | Tognoni et al. ............. | 348/836 |
| 5,021,763 A * | 6/1991 | Obear ............. | 340/407.2 |
| 5,119,204 A | 6/1992 | Hashimoto et al. | |
| 5,229,684 A | 7/1993 | Althans et al. ............. | 313/402 |
| 5,416,610 A * | 5/1995 | Kikinis ............. | 358/474 |
| 5,742,360 A * | 4/1998 | Kwon et al. ............. | 348/839 |
| 5,797,570 A * | 8/1998 | Dolan et al. ............. | 248/205.3 |
| 5,805,163 A * | 9/1998 | Bagnas ............. | 715/768 |
| 5,835,342 A * | 11/1998 | Hunte ............. | 361/681 |
| 5,841,227 A * | 11/1998 | Terpin ............. | 313/479 |
| 5,913,582 A * | 6/1999 | Coonan ............. | 312/223.3 |
| 5,946,635 A * | 8/1999 | Dominguez ............. | 455/558 |
| 5,970,980 A * | 10/1999 | Adair ............. | 128/849 |
| 5,971,548 A * | 10/1999 | Hung ............. | 359/609 |
| 5,990,985 A * | 11/1999 | Kim ............. | 348/836 |
| 6,018,375 A * | 1/2000 | Lim ............. | 348/829 |
| 6,124,901 A * | 9/2000 | Diven et al. ............. | 348/822 |
| 6,157,416 A * | 12/2000 | Whitelaw et al. ............. | 348/789 |
| 6,301,100 B1 * | 10/2001 | Iwata ............. | 361/683 |
| 6,462,939 B1 * | 10/2002 | Heirich ............. | 361/682 |
| 6,493,045 B1 * | 12/2002 | Heirich ............. | 348/836 |
| 6,575,541 B1 * | 6/2003 | Hedrick et al. ............. | 312/223.1 |
| 6,788,275 B1 * | 9/2004 | Sueki ............. | 345/32 |
| 2005/0129267 A1 * | 6/2005 | Azima et al. ............. | 381/431 |

FOREIGN PATENT DOCUMENTS

CN    1305340 A    7/2001

* cited by examiner

*Primary Examiner* — Behrooz Senfi

(57) ABSTRACT

A display device, suitable for e.g. a TV set or a monitor, comprises a housing and a picture display unit, particularly a picture tube. The housing has a window, and the picture display unit, which is surrounded by the housing, has a front face that is oriented parallel to the window. In order to obtain a flush look, the window is formed from a transparent wall portion of the housing.

18 Claims, 2 Drawing Sheets

DISPLAY DEVICE COMPRISING A HOUSING AND A PICTURE DISPLAY UNIT

Figure 1:
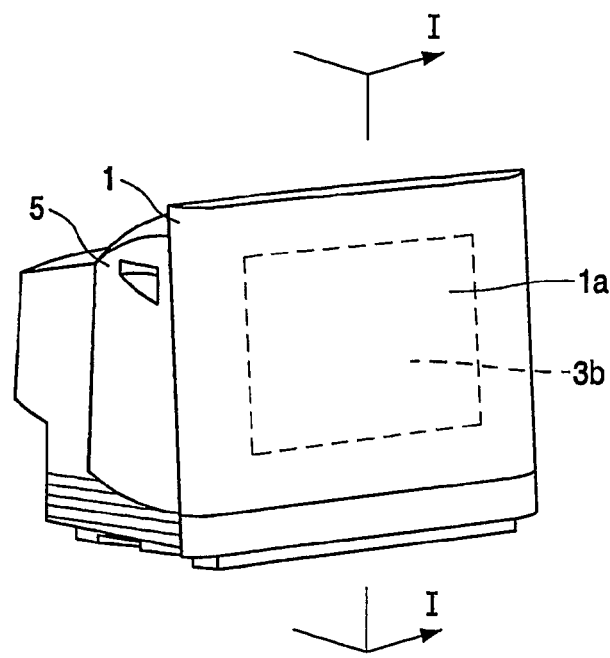

The invention relates to a display device, suitable for e.g. a television set or a monitor, comprising a housing and a picture display unit, such as a picture tube. The housing has a window and the picture display unit is surrounded by the housing and has a front face which is oriented substantially parallel to the window.

U.S. Pat. No. 5,224,684 discloses a display device, which is provided with a CRT bulb having a flat faceplate, and a cabinet for enclosing the bulb except for the faceplate. The bulb is secured to the cabinet. In one version a transparent flat panel is superposed over the faceplate and affixed thereto. The cabinet is configured and arranged so as not to extend beyond the plane of the flat panel exterior surface. In another version, where no use is made of a flat panel, the cabinet is configured and arranged so as not to extend beyond the plane of the front surface of the faceplate. In both versions the cabinet has an open window. In this window opening a flat panel secured to the tube may or may not be provided. A drawback of a display device without such a flat panel is the absence of an anti-glare and/or anti-static means. Furthermore, a gap extending around the tube is present between the tube and the cabinet. Moreover there is no protection on the front side of the device against implosion of the tube. The known display device provided with the faceplate also has a gap, which in this case extends between the faceplate and the surrounding cabinet. Gaps always cause problems, such as safety problems, construction problems and design problems.

It is an object of the invention to provide a display device in which the combination of housing and picture display unit forms a safe, strong and attractive entity.

This object is achieved by the display device according to the invention, which comprises a housing and a picture display unit, the housing having a window, and the picture display unit having a front face oriented substantially parallel to the window, wherein the window is formed from a transparent wall portion of the housing. In this device the visible front face of the picture display unit is fully enclosed by the housing, the front face of the picture display unit being visible through an optically clear housing portion forming the window to make sure that images displayed can be looked at. The transparent wall portion, which is positioned in the plane of the window, is preferably anti-reflective. Since a completely flush look is obtained along the front of the housing, which may be a part of a cabinet, no problems relating to gaps between the picture display unit and the housing occur, resulting in advantages, such as improved safety and improved structural strength of the housing. Moreover, the device according to the invention has an attractive front portion and makes it possible to reduce the thickness of the picture display unit's front in order to save weight. The picture display unit may be a cathode ray tube, a liquid crystal display, a plasma display unit or another video display unit. The device according to the invention may be applied in a TV set or a monitor.

An embodiment of the device according to the invention is characterized in that the transparent wall portion is an integral part of the wall structure of the housing. The housing is preferably a one-piece housing.

The housing of the device according to the invention is preferably manufactured in an injection molding process. In such a process the transparent wall portion is made of a transparent material, which can be a thermoplastic material, preferably HIPS, ABS or PC-ABS, and the other wall portions of the housing may be formed by injecting a non-transparent or less transparent material of compatible thermoplastic resin, such as HIPS, ABS or PC-ABS. In an alternative version, the whole housing is made of transparent material, whereafter the walls, with the exception of the window portion, are rendered opaque by a non-transparent coating of a suitable material, such as PC, ABS or PC-ABS, for which a painting process can be used. In this context, embodiments of the display device according to the invention are defined in Claims 5 and 6.

A very attractive embodiment of the device according to the invention is characterized in that the front face of the picture display unit and the transparent wall portion forming the window of the housing are flat. In this embodiment a flush flat look has been attained.

The invention also relates to a TV set or a monitor provided with the display device according to the invention.

With reference to the claims, it is to be noted that various characteristic features as defined in the set of claims may occur in combination.

These and other aspects of the invention are apparent from and will be elucidated, by way of non-limitative example, with reference to the embodiments described hereinafter.

Figure 2:
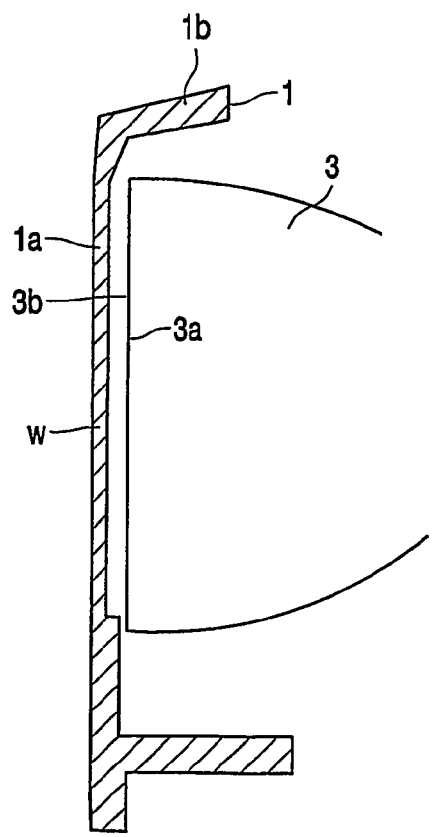
Figure 3:
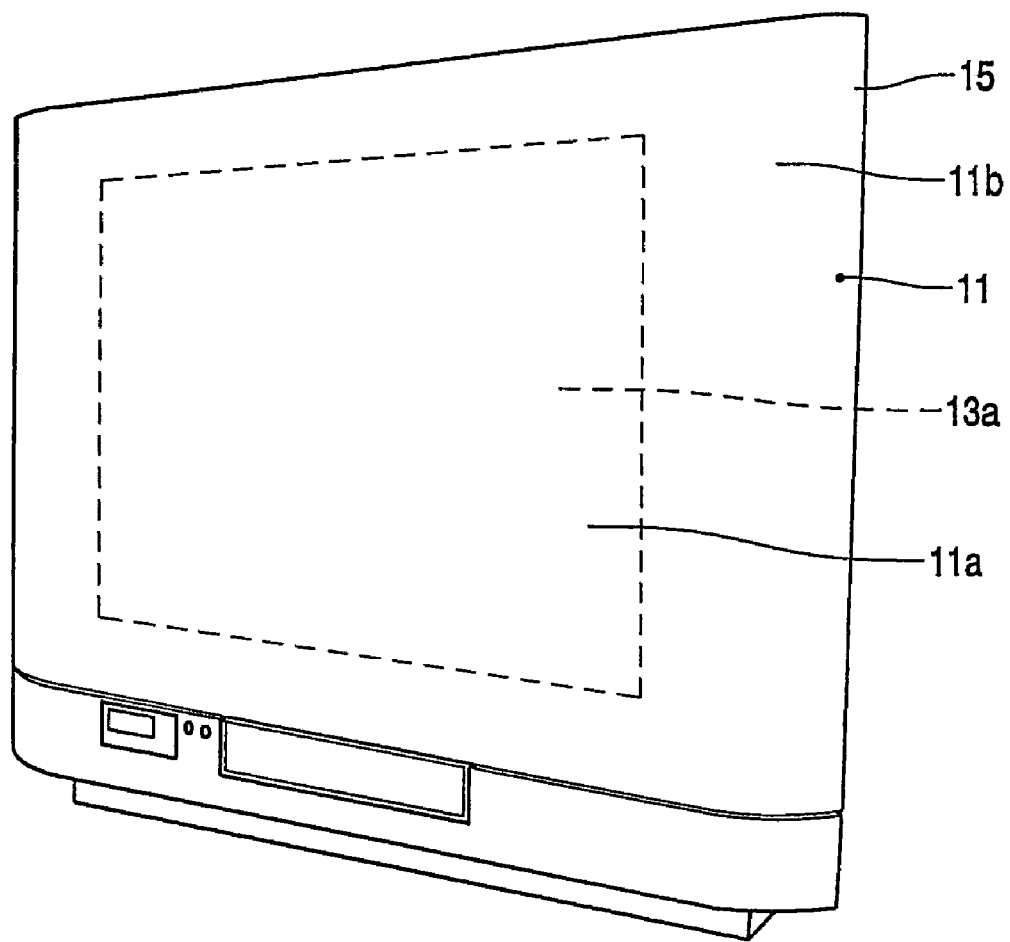

In the drawings:

FIG. 1 is a perspective view of a first embodiment of the display device according to the invention, FIG. 2 is a diagrammatic cross-sectional view according to I-I in FIG. 1 of the first embodiment and FIG. 3 is a perspective view of a second embodiment of the display device according to the invention.

The display device shown in FIGS. 1 and 2 includes a housing 1 and a picture display unit, in the form of a picture tube 3, surrounded by the housing 1 and having a flat picture screen 3a forming a front face 3b. The housing 1, which is part of a cabinet 5, includes a flat transparent wall portion 1a forming a window w extending opposite to the picture screen 3a. The transparent wall portion 1a forms and integral wall structure with the other non-transparent wall portions 1b of the housing 1. This one-piece wall structure is made from HIPS by an injection molding process and provides a perfectly flush look along the flat front side of the device.

The display device shown in FIG. 3 comprises a cabinet 15 with a housing 11 and it further comprises a picture display unit with a viewing screen 13a. The picture display unit is enclosed by the cabinet 15, and the housing 11 surrounds the screen 13a. The transparent housing 11 is an injection-molded wall structure made of transparent ABS and comprises a transparent wall portion 11a facing the viewing screen 13a and forming a window, and opaque wall portions 11b obtained by painting the wall structure excepting the window w formed by the wall portion 11a.

The display devices as indicated in the drawings may be used in TV sets or monitors. It is further to be noted that the invention is not restricted to the embodiments shown. Within the scope of the invention it is e.g. possible to built up the housing from several parts instead of applying a one-piece injection molded housing. It is also possible that the cabinet is absent, e.g. in the case of built-in appliances. Moreover, several kinds of picture display units can be applied in combination with a window formed as described in this document.

The invention claimed is:

1. A display device comprising:
    a picture display unit and a housing receiving and surrounding the picture display unit, the housing having a window, and the picture display unit having a front face oriented substantially parallel with and proximal to the window,
    wherein the front face of the picture display unit is fully enclosed by the housing, wherein the front face of the picture display unit and the window forming a transparent wall portion of the housing are flat such that no gap exists there between, wherein the housing is a one-piece housing including said window forming said transparent wall portion and adjoining non-transparent wall portions and wherein the window is formed from the transparent wall portion of the housing and forms an integral wall structure that is flush with the non-transparent wall portions of the housing that provides a flush look along a flat front side of the display device.

2. A display device as claimed in claim 1, wherein the housing comprises a wall structure, and the transparent wall portion is an integral part of the wall structure of the housing.

3. A display device as claimed in claim 1, wherein the housing is an injection molded product.

4. A display device as claimed in claim 2, wherein a part of the wall structure, including at least the transparent portion, is made of a transparent material and the rest of the wall structure is made of a less transparent or non-transparent material.

5. A display device as claimed in claim 2, wherein the housing is made of a transparent material, the wall structure, except for the transparent wall portion, being opaque by the presence of a non-transparent covering material.

6. A display device as claimed in claim 1, wherein the front face of the picture display unit and the transparent wall portion of the housing are flat.

7. A display device as claimed in claim 1, wherein the display device is a television.

8. A display device as claimed in claim 1, wherein the display device is a monitor.

wherein the front face of the picture display unit is fully enclosed by the housing, wherein the front face of the picture display unit and the window forming a transparent wall portion of the housing are flat such that no gap exists there between, wherein the housing is a one-piece housing including said window forming said transparent wall portion and adjoining non-transparent wall portions and wherein the window is formed from the transparent wall portion of the housing and forms an integral wall structure that is flush with the non-transparent wall portions of the housing that provides a flush look along a flat front side of the display device.

9. A housing for a television or monitor, wherein the housing surrounds a picture display unit and comprises a front panel arranged to receive the picture display unit, the front panel including:

a substantially planar front surface that is larger than a front surface of the picture display unit, and a rear surface that includes a recessed area that is sized to receive the front surface of the picture display unit, the recessed area corresponding to a substantially transparent window of the front panel for viewing images on the picture display unit, wherein the front face of the picture display unit and the window forming a transparent wall portion of the housing are flat such that no gap exists there between, wherein the front face of the picture display unit is fully enclosed by the housing, wherein an entirety of the front panel is an integral unit made from a one-piece housing including said substantially transparent window comprising said transparent wall portion and adjoining non-transparent wall portions, and wherein the window is formed from the transparent wall portion of the housing and forms an integral wall structure that is flush with the non-transparent wall portions of the housing that provides a flush look along a flat front side of the display device.

10. The housing of claim 9, wherein the front panel is an injection molded product.

11. The housing of claim 9, wherein the front surface of the front panel beyond the transparent window is substantially opaque.

12. The housing of claim 9, wherein one or more edges of the front panel are tapered.

13. The housing of claim 9, wherein the transparent window is substantially anti-reflective.

14. The housing of claim 9, including a cabinet that is configured to enclose the picture display unit.

15. The housing of claim 9, including the picture display unit.

16. A method for forming a housing for a display device, the method comprising:

injection molding a panel of a housing for a television or monitor that includes a picture display unit, the panel having a perimeter area that is thicker than a center transparent area of the panel, the center transparent area being sized to receive and protect a front portion of the picture display unit, placing the picture display unit within a cabinet that encloses the picture display unit except for a front face of the picture display unit, affixing the panel to the cabinet to cover the front face of the picture display unit and complete the housing, wherein the front face of the picture display unit and the window forming a transparent wall portion of the housing are flat such that no gap exists there between, wherein the front face of the picture display unit is fully enclosed by the housing, wherein an entirety of the front panel of the housing is an integral unit made from a one-piece casing including the center transparent area and non-transparent perimeter area, and wherein the window is formed from the center transparent area and forms an integral wall structure that is flush with the non-transparent perimeter area of the panel of the housing that provides a flush look along a flat front side of the display device.

17. The method of claim 16, including coating areas of the panel beyond the center transparent area to render the areas opaque.

18. The method of claim 16, wherein one or more edges of the panel are tapered.

* * * * *